Figure 1:
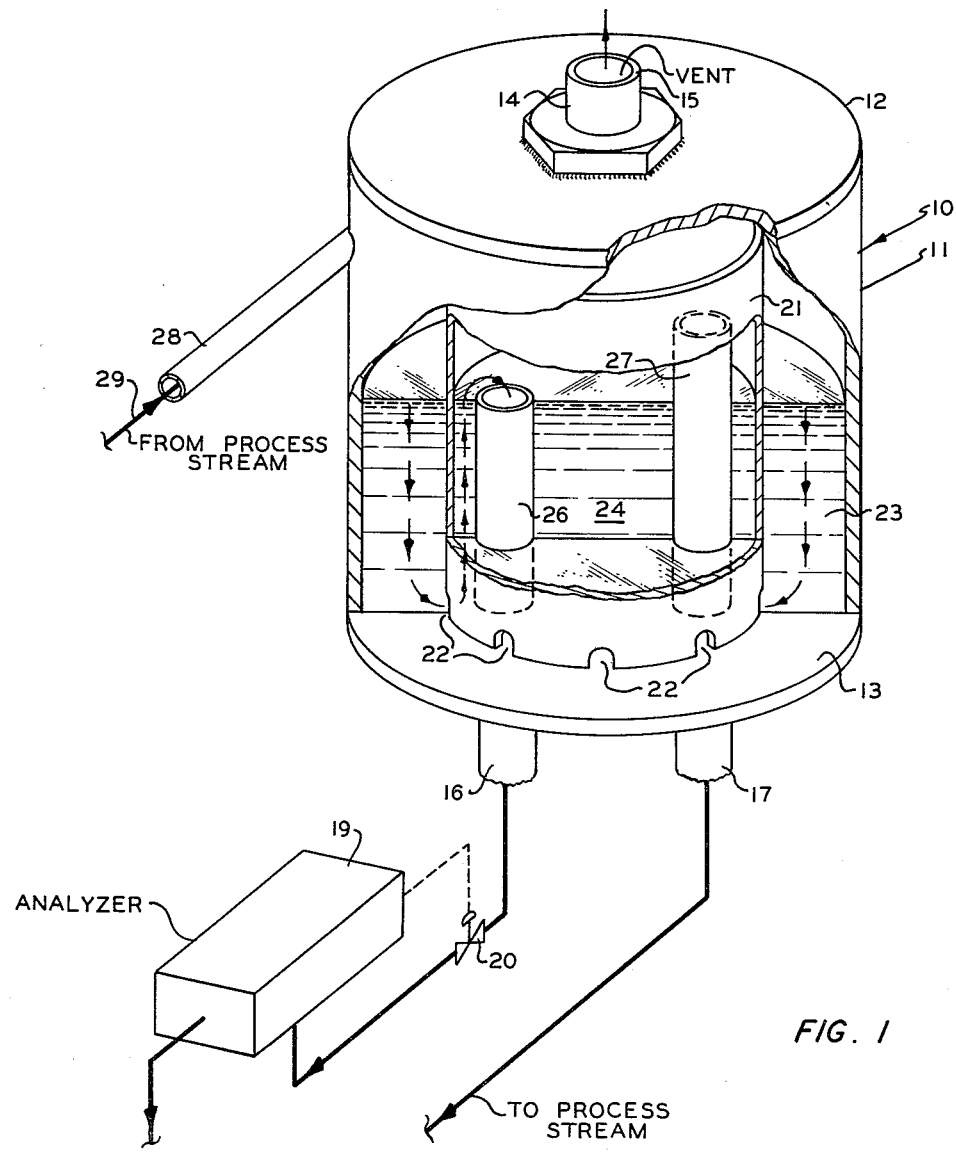

July 17, 1962   R. G. BEARDEN ETAL   3,044,236
SYSTEM FOR REMOVAL OF GASES FROM LIQUIDS
Filed July 21, 1960   2 Sheets-Sheet 1

INVENTORS
R.G. BEARDEN
L.G. SCHWIEGER
BY
*Hudson & Young*
ATTORNEYS

INVENTORS
R.G. BEARDEN
L.G. SCHWIEGER
BY
*Hudson & Young*
ATTORNEYS

United States Patent Office 3,044,236
Patented July 17, 1962

3,044,236
SYSTEM FOR REMOVAL OF GASES FROM LIQUIDS
Robert G. Bearden, Idaho Falls, Idaho, and Leander G. Schwieger, Citrus Heights, Calif., assignors to Phillips Petroleum Company, a corporation of Delaware
Filed July 21, 1960, Ser. No. 44,302
4 Claims. (Cl. 55—204)

This invention relates to an apparatus and method for removing finely dispersed gases from liquids. In another aspect it relates to preparation of gas-free samples from chemical process streams of widely varying viscosities prior to their analysis.

In order to provide continuous sample streams for chemical process monitors and control instruments, such as optical photometers, refractometers, mass spectrometers, or other optical instruments, it is generally necessary to remove any gases which may be dispersed or dissolved in the process stream. This cannot be accomplished quickly enough by standard degassing methods because any appreciable time lag will adversely effect the instrument response time, or permit the existence and accumulation of so many variables that the degassing unit must be unduly complex. Examples of streams which contain dissolved gases include aqueous waste streams, streams from adsorption towers, and hydraulic fluids. Generally speaking, the volume of the sample required for such analysis instruments is quite small in comparison with the volume of the process stream, but optical monitoring makes it desirable that this sample stream be undistorted by changing turbidity due to variations in the percentage of dissolved gases.

In accordance with the present invention, we have discovered that gases can be advantageously separated from liquid and vapor streams by the use of a gas disengager unit, of small size, rapid action, high efficiency, and minimum volume hold-up. A relatively small volume of the process stream is directed first to the gas disengager and then to the optical instrument. As to the operation of the gas disengager, a gas-liquid mixture is introduced tangentially to the inside surface of a circular outer wall thereof to produce filming and streaming as the mixture falls to the surface of the liquid in a circular trough. The inner wall of the circular trough has small evenly spaced holes at its bottom to permit liquid to flow from the bottom layer in the trough into the inner chamber which is provided with a pair of weir drains of different heights. The height of the lower weir determines and maintains the liquid level in the bottom of the circular trough, as well as in the inner chamber. The degassed liquid drains from the disengager unit via the bottom of lower weir and passes to the optical analyzer, while the stripped gas escapes through an outlet provided in the top of the disengager. Thus, the gas is disengaged from the sample stream, first, by filming, streaming, cyclone action, and finally by settling.

The higher weir in this embodiment serves to provide an overflow return line to the stream or vessel being sampled, usually during the time that the passage of the degassed sample stream through the lower weir outlet to the optical measuring instrument is interrupted. An automatic shutoff valve is provided in this latter line since sample flow through the analyzer instrument is desired only periodically, that is, when a measurement is to be made. The higher weir performs a second function of controlling the effect of any surges in the sample stream flow rate that are beyond the capacity of the gas disengager or the analyzer instrument to handle. Thus, the higher weir also serves to limit variations in hydrostatic head to the vertical distance between the two weirs disposed within the disengager.

In another embodiment of this invention, an ultrasonic generator is affixed to the lower surface of the disengager, commercially available types are most conveniently mounted surrounding the drain line. This embodiment of the invention is particularly well suited to the situation where the sample stream is of relatively higher viscosity and permits degassing according to the method of this invention. We have found that the gases dissolved in viscous liquids can be conveniently expelled prior to passing the said liquids to optical measurement.

Accordingly, it is an object of this invention to provide an improved system for supplying sample streams to optical analysis instruments.

Another object is to provide a sample stream preparation system which incorporates a novel gas disengager to remove dissolved gases from a fluid sample stream that is to be optically analyzed.

Yet another object is to provide a gas disengager that can prepare gas-free samples from chemical process streams of widely varying viscosities.

A further object is to provide improved monitoring procedures.

Figure 2:
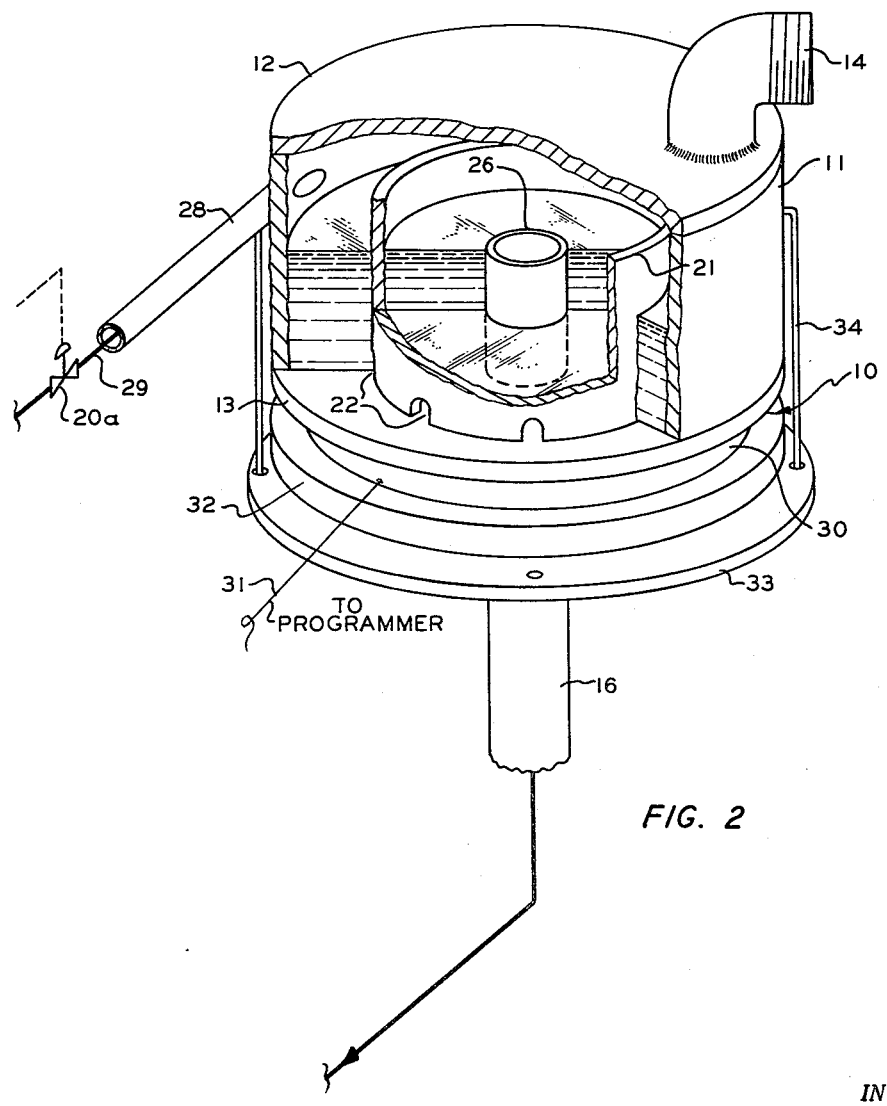

Other objects, advantages and features of this invention will become apparent to those skilled in the art without departing from the scope and spirit of this invention and it should be understood that the latter is not necessarily limited to the above-mentioned discussion and drawing, in which:

FIGURE 1 is a perspective view in partial section of the gas disengager unit of this invention; and, FIGURE 2 is a perspective view in partial section of another embodiment of the gas disengager unit of this invention.

Referring now to the drawing in detail, wherein like parts have been designated by like reference numerals, and to FIGURE 1 in particular, there is shown a gas disengager unit, generally designated 10, for sample stream analysis system.

Gas disengager 10 comprises an outer casing 11 closed at the upper and lower ends thereof by plates 12 and 13, respectively. Upper plate 12 is provided with an outlet 14 for the venting of gas from the disengager unit. Outlet 14, in one embodiment, comprises a ⅜-inch Swaglok fitting of stainless steel, welded to top plate 12. This fitting permits a tubing 15 to be connected and the separated gas to be conducted away to a convenient and safe disposal, if the gas is of a nature so as to make it undesirable to vent in the vicinity of the disengager unit.

Lower plate 13 of disengager 10 is provided with a second and third outlet means, 16 and 17, respectively, for the draining of liquid from the disengager. The portion of these conduits adjacent to the plate 13 may also conveniently comprise stainless steel Swaglok fittings (not shown) welded to bottom plate 13. Conduits 16 and 17 can be conveniently attached thereto by suitable locking nuts. Outlet conduit 16 communicates with an optical analyzer means 19. For a detailed discussion of the design and manner of operation of a typical optical analyzer to be used in conjunction with this invention, see our copending application of R. G. Bearden et al., Serial No. 814,903, filed May 21, 1959. Conduit 16 is further provided with a flow control valve 20 controlled by optical analyzer 19 for admitting a degassed sample stream to the analyzer only as directed. Conduit 17 conducts the sample stream, when not being passed to analyzer 19, back to the process stream or vessel (not shown) being sampled.

Within disengager 10, an inner casing 21 is centrally disposed mounted on lower plate 13, but open at its upper end, below upper plate 12. Inner case 21 is provided with a plurality of peripheral perforations, such as 22, near the lower end thereof, which are disposed in substantially regular fashion about the inner casing. Perforations 22 permit liquid to flow from the circular trough 23, defined by the walls of casings 11 and 21, to an inner chamber 24 defined by said inner casing 21 alone. A first and second weirs, 26 and 27, are disposed within inner casing 21, with a difference in height of approximately ½-inch. Lower weir 26 is disposed adjacent to and in communication with the disengager end of outlet conduit 16, while higher weir 27 is disposed adjacent to and in communication with outlet conduit 17. The difference in height of the two weirs permits a relatively uniform liquid level to be maintained within disengager 10 intermediate the upper ends of weirs 26 and 27. Upper weir 27 is adapted to drain from said gas disengager any liquid which rises above the level defined by said weir, due to variations in the flow rate of the sample stream to the gas disengager, or while flow via conduit 16 to analyzer 19 is cut off.

An outlet conduit 28 is attached horizontally and tangentially to outer casing 11 and is in communication with the interior wall thereof. A sample stream 29 from the process stream (not shown) enters disengager 10 via conduit 28, being introduced onto the inside surface of outer casing 11.

In FIGURE 2, another embodiment of the present invention is shown, which is adapted to the degassing of viscous liquids that cannot be satisfactorily treated in the embodiment of FIGURE 1. Disengager 10, in this embodiment, is provided with only a single outlet drain 16, in order that an ultrasonic generator 30, such as a piezoelectric crystal, may be fastened to lower plate 13 and disposed about outlet 16. Electrical lead 31 will pass a current to generator 30 to energize the same, when so directed by a programmer (not shown). Sample stream will be admitted to the disengager via inlet conduit 28 only when the optical analyzer (not shown) is ready to make a reading, since no recycle line to the process stream is provided in this embodiment. Therefore, the flow control valve 20a is disposed upstream of disengager 10 in this embodiment.

A cover 32 is located adjacent to the lower surface of generator 30 and is preferably composed of a thermosetting plastic which is chemically inert and heat resistant, such as Teflon (a polymer of tetrafluoroethylene). A retaining plate 33 is also preferably provided adjacent cover 32 for receiving therein threaded retaining bolts 34. Retaining nuts (not shown) will secure bolts 34 to plate 33 on the underside thereof. With the exceptions just noted, the apparatus and its principle of operation are identical to that of the first embodiment.

In operation, a fluid sample stream in FIGURE 1 is being continuously withdrawn from a process stream or vessel (not shown) via conduit 29. The sample stream enters gas disengager 10 via horizontal inlet conduit 28 where the gas-liquid mixture is introduced tangentially to the inside surface of outer wall 11 near the upper end thereof. The impingement of the sample stream on the inner wall produces a filming and streaming action as the mixture falls to the surface of the liquid in circular trough 23. The separated gases are vented from the top of disengager 10 via outlet conduit 14. The falling degassed liquid collects in the bottom of the circular trough, but due to the plurality of perforations 22 in the bottom portion of inner casing 21, it quickly flows into the inner chamber 24, establishing a common level within the disengager. The level of the degassed liquid rises steadily until it reaches the level of lower weir 26. Since outlet conduit 16 to optical instrument 19 is normally held closed by motor valve 20, the liquid level continues to rise to the level of upper weir 27. The degassed sample liquid then passes from disengager 10 via weir 27 and outlet conduit 17 back to the process stream or vessel.

When optical analyzer 19 is ready to receive sample liquid for measurement, a signal is passed from the programmer unit (not shown) of analyzer 19, opening control valve 20 and permitting the degassed liquid to flow via weir 26 and outlet conduit 16 to the analyzer. When the measurement is completed, a second signal is sent to motor valve 20, again shutting off flow through conduit 16 from chamber 24. The degassed liquid level rises and is again returned to the process stream via outlet conduit 17, until a new measurement is to be made.

Regarding the operation of the second embodiment of the invention, shown in FIGURE 2, the sample stream is permitted to enter the disengager 10 via conduit 28, only when the flow control valve 20a therein is directed to be opened by the programmer unit (not shown) of analyzer 19. Thus, only a single weir is needed within disengager 10 to conduct degassed viscous sample liquid to the analyzer. Also, upon simultaneous signal from the programmer unit (not shown) of analyzer 19, the ultrasonic wave generator 30, disposed adjacent to bottom plate 13 is energized, and generates ultrasonic waves to aid in the gas disengagement action, so long as sample stream is entering the disengager via inlet conduit 28. The ultrasonic generator 31 may preferably be directed by the programmer to terminate operation a few seconds after sample stream flow to disengager 10 is shut off. This time lag between valve and wave generator shutoff is intended to assure that sample liquid already contained in the chamber will be degassed before passing on to analyzer 19.

For a discussion of the design and manner of operation of a typical ultrasonic generator, to be used in conjunction with the second embodiment of this invention, see the catalog of the Gulton Manufacturing Corporation of Metuchen, New Jersey, entitled, "Piezoelectric Ceramic Transducers." For a more detailed discussion of the theory of operation of crystals and crystal holders for ultrasonic use, see the text "Ultrasonics" by Benson Carlin (1949), McGraw-Hill Book Co.

Although the gas disengager of this invention is described as applied to an optical analyzer system, it is not limited thereto, but it can be employed in any situation where separation of a finely dispersed gas in a liquid is indicated.

Reasonable variations and modifications are possible within the scope of this disclosure without departing from the spirit and scope of this invention.

We claim:

1. A gas disengager comprising an outer casing closed at the upper and lower ends thereof, the said upper end being provided with the first outlet means for the venting of gas, the said lower end being provided with a second outlet means for the draining of liquid from said disengager, an inner casing centrally disposed within said outer casing and open at the upper end, a plurality of peripheral perforations in the lower portion of said inner casing, a weir within said inner casing adjacent to the upper end of said second outlet means, said weir permitting a uniform liquid level to be maintained within and intermediate the ends of said outer casing, and conduit means for horizontally and tangentially introducing a sample stream to the inside surface of said outer casing.

2. A gas disengager comprising an outer casing closed at the upper and lower ends thereof, the said upper end being provided a first outlet means for the venting of gas, the said lower end being proivded with a second and third outlet means for draining of liquid from said disengager, the said second outlet means communicating between said disengager and an optical analyzer, an inner casing centrally disposed within said outer casing and open at the upper end, a plurality of peripheral perforations in the lower portion of said inner casing to permit liquid to flow from a circular trough defined by said casings to an inner chamber described by said inner casing, a first and second weirs within said inner casing and adjacent to the upper ends of said second and third outlet means, respectively, the first and lower of said weirs permitting a uniform liquid level to be maintained intermediate the ends of said inner and outer casings, the second and higher of said weirs adapted to drain from said gas disengager any liquid which rises to the upper end thereof due to variations in sample stream flow rates which may exceed the draining capacity of said first weir, fourth conduit means for horizontally and tangentially introducing said sample stream to the inside surface of said outer casing, thereby permitting filming, streaming, and settling of the liquid portion of said sample stream to separate said liquid from said gases, and an ultrasonic generator positioned adjacent the lower end of said outer casing to supply ultrasonic waves therethrough, as desired.

3. A gas disengager comprising an outer casing closed at the upper and lower ends thereof, the said upper end being provided a first outlet means for the venting of gas, the said lower end being provided with a second and third outlet means for draining of liquid from said disengager, the said second outlet means communicating between said disengager and an optical analyzer, an inner casing centrally disposed within said outer casing and open at the upper end, a plurality of peripheral perforations in the lower portion of said inner casing to permit liquid to flow from a circular trough defined by said casings to an inner chamber described by said inner casing, a first and second weirs within said inner casing and adjacent to the upper ends of said second and third outlet means, respectively, the first and lower of said weirs permitting a uniform liquid level to be maintained intermediate the ends of said inner and outer casings, the second and higher of said weirs adapted to drain from said gas disengager any liquid which rises to the upper end thereof due to variations in sample stream flow rates which may exceed the draining capacity of said first weir, fourth conduit means for horizontally and tangentially introducing said sample stream to the inside surface of said outer casing, thereby permitting filming, streaming, and settling of the liquid portion of said sample stream to separate said liquid from said gases, and an annular crystal ultrasonic generator positioned adjacent the lower end of said outer casing and surrounding said second outlet means to supply ultrasonic waves therethrough as desired.

4. A gas disengager comprising an outer casing closed at the lower end thereof, the upper end of said casing adapted for the venting of gas, the said lower end being provided with a first outlet means for the draining of liquid from said disengager, an inner casing centrally disposed within said outer casing and open at the upper end, a plurality of perforations in the lower portion of said casing, a weir within said inner casing adjacent to the upper end of said first outlet means, said weir permitting a uniform liquid level to be maintained within and intermediate the end of said outer casing, and conduit means for horizontally and tangentially introducing a sample stream to the inside surface of said outer casing.

References Cited in the file of this patent
UNITED STATES PATENTS

| 2,620,894 | Peterson et al. | Dec. 9, 1952 |
| 2,852,091 | Boudreaux et al. | Sept. 16, 1958 |
| 2,976,761 | Whitehead et al. | Mar. 28, 1961 |

FOREIGN PATENTS

| 1,173,077 | France | Oct. 20, 1958 |